March 6, 1962 J. JIPP 3,024,311

SIGNAL SYSTEM

Filed Jan. 29, 1957 3 Sheets-Sheet 1

INVENTOR.
John Jipp
BY
Fletcher & Swain[?]
ATTORNEYS

March 6, 1962

J. JIPP 3,024,311

SIGNAL SYSTEM

Filed Jan. 29, 1957

3 Sheets-Sheet 2

INVENTOR.
John Jipp
BY
Fisher & Swain
ATTORNEYS

INVENTOR.
John Jipp
BY
Fleher & Swain
ATTORNEYS 3,024,311

SIGNAL SYSTEM

John Jipp, Menlo Park, Calif., assignor to Ampex Corporation, Redwood City, Calif., a corporation of California Filed Jan. 29, 1957, Ser. No. 637,031
5 Claims. (Cl. 179—15)

This invention relates generally to systems for the handling of a plurality of separate signals.

Conventional systems for handling separate signals to be transmitted over a common line employ various types of multiplexing or signal channel discrimination. For example, separate carrier frequencies may be employed to provide the desired signal channels. In many instances there are serious objections to the use of carrier frequencies or other conventional forms of multiplexing. For example, where a subscriber desires to apply a plurality of signals simultaneously to commercial communication lines (i.e. telephone or telegraph) conventional methods of multiplexing may not be compatible with the carrier or like multiplexing systems employed by the communication company.

In general it is an object of the present invention to provide a novel system for the handling of a plurality of signals, which will make possible a composite signal that can be transmitted over conventional communication lines or systems.

Another object of the invention is to provide a system of the above character which is particularly applicable to signals within the audio range, which are susceptible to compression and expansion.

Another object of the invention is to provide a novel apparatus capable of producing a composite signal from a plurality of separate signals, and which can be readily decoded.

Additional objects and features of the invention will appear from the following description in which the preferred embodiment has been set forth in detail in conjunction with the accompanying drawing.

Referring to the drawing.

In accordance with the present invention a plurality of signals are recorded in separate tracks on a magnetic tape. Portions of the several tracks are successively transduced in conjunction with compression of the transduced signal portions in point of time. The compressed signal portions are combined to form a single composite signal. Such a composite signal can be transmitted to a receiving station by conventional telegraph, telephone, or radio systems. At the receiving station the several signal portions are each expanded and decoded to form the several original signals.

Figure 1:
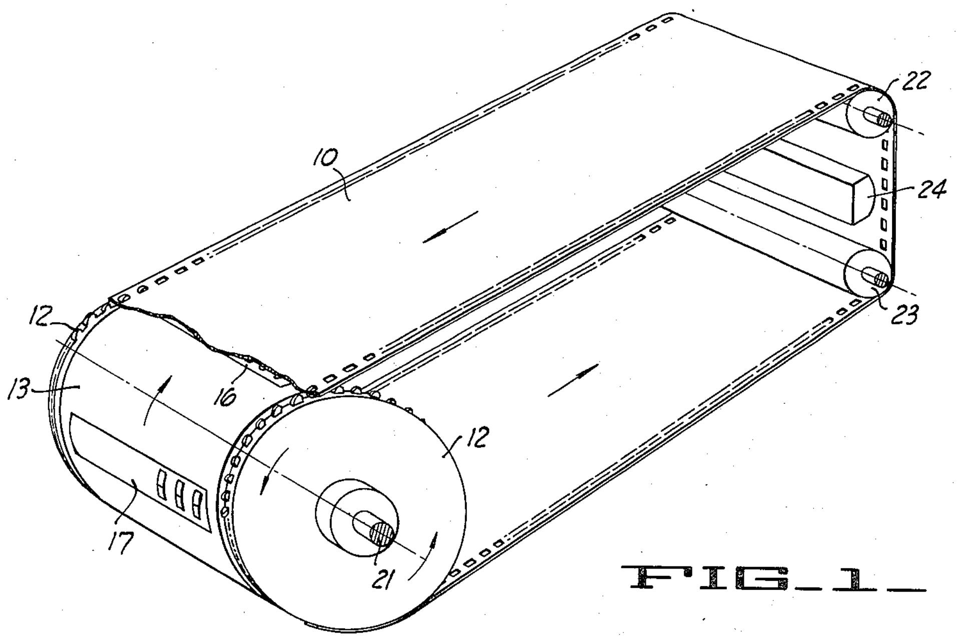
FIGURE 1 is a perspective view schematically illustrating apparatus incorporating the present invention.
Figure 2:
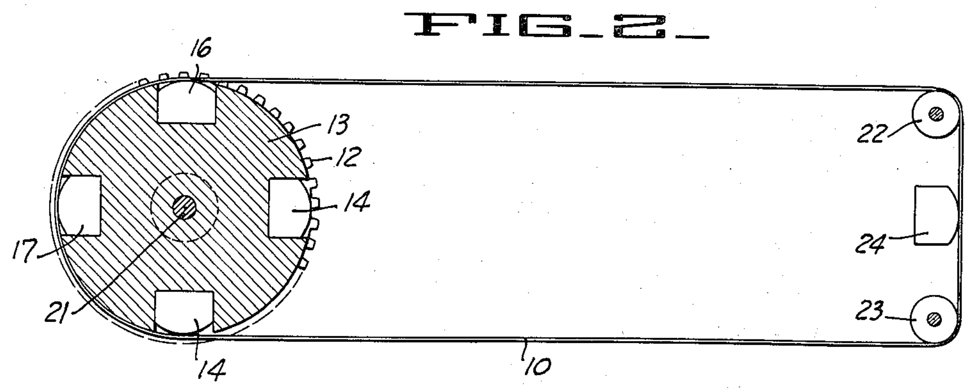
FIGURE 2 is a side elevational view of the apparatus shown in FIGURE 1.
Figure 3:
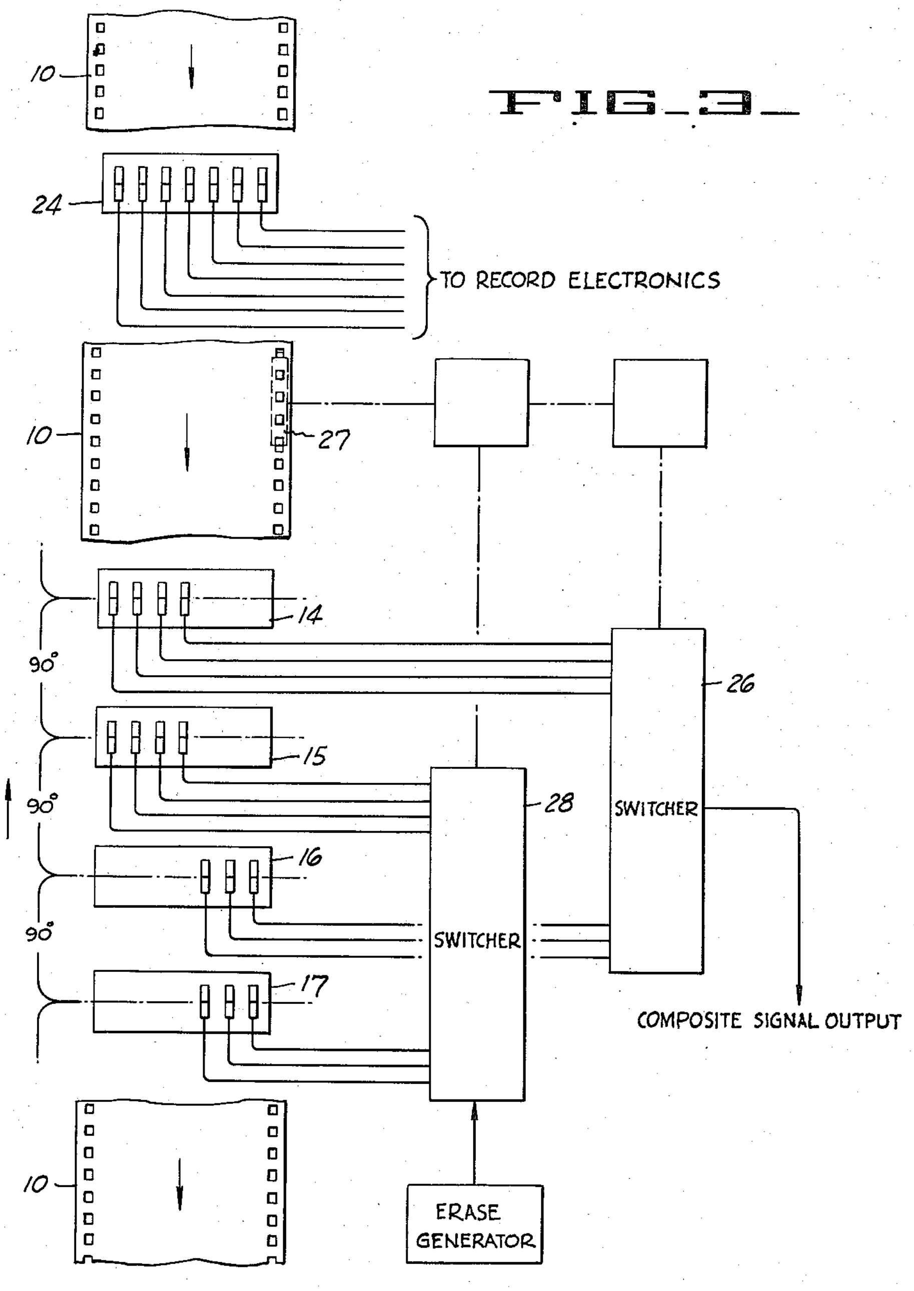
FIGURE 3 is a schematic view illustrating the apparatus of FIGURE 1 being used for forming a composite signal.

The apparatus schematically illustrated in FIGURES 1 and 2, is constructed as follows:

A magnetic tape 10 is provided in the form of an endless belt. The belt is shown engaging the sprocket wheels 12 that are mounted for rotation about a common axis. A drum 13 is rotatably mounted between the sprocket wheels 12, and serves to carry a plurality of magnetic head assemblies 14, 15, 16 and 17. Assemblies 14 and 16 each comprise a plurality of magnetic reproducing heads, and assemblies 15 and 17 each comprise a plurality of erase heads. By way of example, four reproducing heads are shown in FIGURE 3 incorporated in the assembly 14, and three heads in the assembly 16. Four erase heads are shown incorporated in the assembly 15, and three erase heads in the assembly 17. Assemblies 14 and 16 are staggered with respect to each other, and heads 15 and 17 are likewise staggered. The angular displacement of the heads in this instance is 90 degrees. Suitable drive means (not shown) is connected to the shaft 21 upon which the drum is mounted, whereby the drum is driven at a predetermined speed opposite to the rotation of the sprocket wheels 12. At least one of the wheels 12 is likewise driven by suitable means (not shown) whereby the belt is moved at a desired constant speed.

The belt 10 is also shown engaging the guide rollers 22 and 23, which are rotatably carried by suitable supporting means (not shown) and the inner face of the belt between the rollers 22 and 23, is engaged by the head assembly 24. This assembly consists of a plurality of magnetic record heads operating upon separate parallel record tracks. These tracks are in alignment with the several reproduce and erase heads provided by the assemblies 14—17.

FIGURE 3 supplements FIGURES 1 and 2. In this instance the assemblies 14—17 have been developed on a common plane. The several heads of the assembly 24 are indicated as connected to record electronics, whereby separate sound or other audio signals are applied to the separate record tracks. The reproducing head assemblies 14 and 16 are shown having their individual heads connected to the switcher 26, the output of which is a composite signal. The switcher 26 operates in predetermined time relationship to the movement of the belt 10, by the use of suitable synchronizing means. The synchronizing means schematically illustrated consists of a sprocket wheel 27 which engages the belt, and which connects mechanically to the switcher 26. The switcher can be one of the mechanical commutating type in which the several heads are successively connected to the output.

The erase heads 15 and 17 are likewise shown connected to the switcher 28. Operation of this switcher is likewise synchronized with motion of the belt, as is indicated by a mechanical connection to sprocket 27. Switcher 28 may be constructed similar to switcher 26.

It will be evident to those familiar with synchronizing devices that electronic switchers can be used instead of mechanical commutating devices. Such switchers may be controlled for example by pulses recorded on one edge of the belt, and transduced for application to control the switcher electronics.

Operation of the apparatus described above is as follows:

It will be assumed that the belt 10 is being driven at a speed sufficient to record audio frequencies. Assuming that seven separate signals are being applied to the heads of the assembly 24, seven separate parallel record tracks are formed upon the magnetic belt. For each 180 degrees of rotation of the drum 12, each of the reproducing heads 14 and 16 sweeps across a portion of a record track, and because the direction of rotation is counter to the movement of the belt, the resulting transduced signal is compressed in point of time. The speed of rotation of the drum 13 relative to the movement of the belt is such that there is a seven to one contraction or compression of the transduced signal. In other words, a signal portion is transduced in one-seventh time required to record the same. The switcher 26 serves successively to connect the reproducing heads to the output, during their individual sweeps across the belt. It will be evident that in switching from the first to the last head of the series, all of the heads will make several sweeps across the tape. However the switching means makes a particular head effective for only one sweep. Immediately after the sweep of a head which is effective through the switcher for transducing a signal portion, the succeeding erase head is made effective to carry out an erase operation. Thus all of the record tracks are erased from the belt, as the belt leaves the zone of operation of the drum 13.

Figure 5:
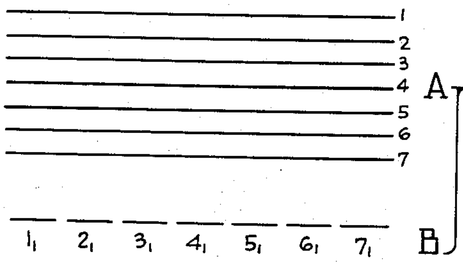
FIGURES 5A and 5B are diagrams illustrating the manner in which a composite signal is formed from a plurality of separate signals.

It will be evident from the foregoing that the output from the switcher 26 will be a composite signal, comprising successive compressed signal portions. This is schematically illustrated in FIGURE 5. FIGURE 5A represents the several signals as recorded upon separate tracks. FIGURE 5B represents the corresponding contracted or compressed signal portions, which form a substantially continuous composite signal.

Figure 4:
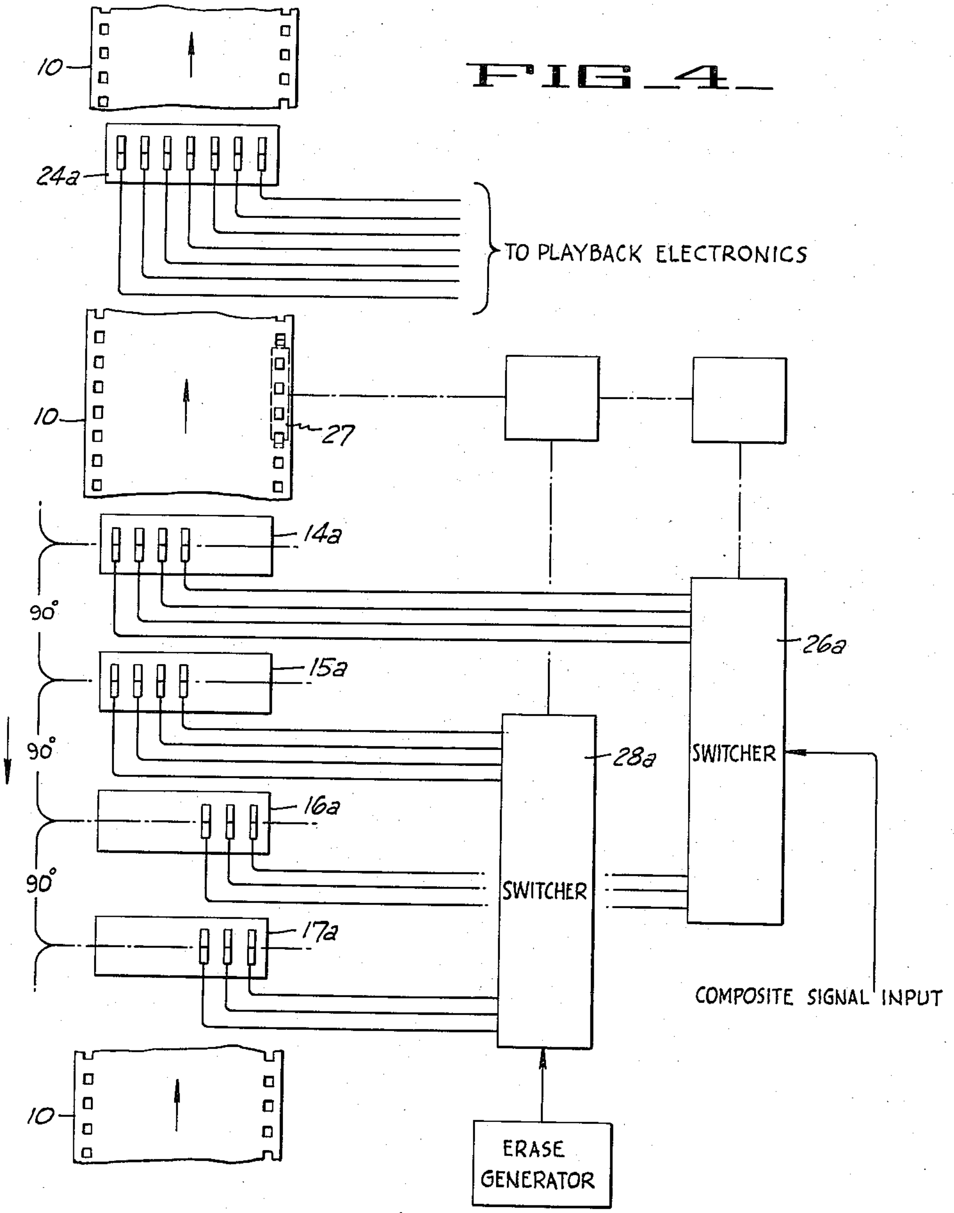
FIGURE 4 is a schematic diagram illustrating use of the apparatus of FIGURE 1 for decoding a composite signal.

Substantially the same apparatus as described above can be used for decoding and translating the composite signal. Thus as shown in FIGURE 4, the head assembly **24*a* corresponds to the assembly 24, but is used to transduce or reproduce separate record tracks. The head assemblies 14*a*—17*a* correspond to the head assemblies 14—17 of FIGURE 3, but the assemblies 14*a* and 16*a* are used for recording, whereas the assemblies 15*a* and 17*a* may or may not be used for erasing operations, immediately preceding recording. Switchers 26*a* and 28*a*, corresponding to the switchers 26 and 28, connect with the heads 14*a*—17*a*. Likewise these switchers are synchronized with movement of the tape. The composite signal from the switcher 26 of FIGURE 3, after transmission over telegraph or telephone lines, or by way of a radio transmitter and receiver, is applied to switcher 26*a*, and thus distributed to the individual heads of the assemblies 14*a* and 16*a*. The direction of movement of the belt, and the direction of movement of the drum, are reversed. For the interval that an individual record head is effective it sweeps over the tape through 180 degrees, and expands one of the compressed signal portions to the original time base. The expanded signal portions are successively recorded on the different track areas, whereby the seven tracks are recorded upon the tape as duplicates of the originally recorded tracks. These record tracks are then transduced by the head assembly 24*a***, to reproduce the original separate signals.

My invention can be used to advantage where the frequency components of the individual signals are such that they can be compressed to a substantial extent and recorded. This is true of frequency components within the sound or audio range. One of the principal features of the invention is the production of a composite signal which can be transmitted to a receiving station by means of conventional communication lines or systems. Also the invention can be used where secrecy is desired. The composite signal by itself cannot be transduced to provide signal intelligence, without employing the procedure previously described. Further secrecy can be assured by scrambling the order of the compressed signal portions in the composite signal, and by changing the order from time to time.

In the foregoing description it is assumed that sound frequencies are directly recorded, with or without conventional high frequency bias. As an alternative I may employ carrier frequency recording, with the carrier being of such intensity as to cause automatic erasure of previously recorded information. Application of such a carrier modulated signal to the record heads 24 permits omission of the erase heads.

As an alternative to switching or commutation, the drum 13 may carry seven helicoidally disposed reproduce heads, with each head positioned to scan a corresponding record track and immediately followed by an erase head. All of such reproduce heads can be connected in parallel to a common signal circuit without the use of switching means, whereby successive signal portions from the several tracks are transduced and compressed to form a composite output signal. The erase heads are connected to a common supply of high frequency erase current. With this arrangement the angular movement of the drum while one head is transducing a record portion of one track, is a fraction of a complete revolution, and in one revolution of the drums, portions from all of the tracks are transduced successively.

Irrespective of the manner in which the heads of the drum connect to a common signal circuit, the drum assembly can be in the form of a smooth surfaced cylinder, with the tips of the heads (and the associated non-magnetic gaps) located in the peripheral surface and exposed for contact with the magnetic coating of the belt.

I claim:

1. In signal apparatus of the character described, magnetic tape transport means for moving a magnetic tape at a constant speed, a plurality of recording heads engaging the tape and adapted to record thereon a plurality of separate signals in separate record tracks, and means for successively energizing and transducing portions of the tracks and for simultaneously compressing the transduced signal portions in point of time, thereby forming a single composite signal containing signal portions representing all of the recorded signals.

2. Apparatus as in claim 1 in which said last named means includes a plurality of reproducing heads, means for moving said heads relative to the tape to effect signal compression, and switching means for connecting said heads successively to a common output.

3. In signal apparatus of the character described, a magnetic belt, transport means for moving the belt at a constant speed, means including a plurality of magnetic heads for recording a plurality of separate signals on the belt along parallel record tracks, a plurality of reproducing heads, means for compressing said recorded signals by moving said reproducing heads over successive adjacent portions of all of the record tracks, a common output, and switching means for effectively connecting the reproducing heads to the common output whereby compressed portions of the recorded signals representing all of the originally recorded signals are successively supplied to the common output as a continuous composite signal.

4. Apparatus as in claim 3 together with a plurality of erase heads, and switching means for rendering said erase heads successively effective to erase a track portion immediately after the same is transduced and compressed.

5. An apparatus of the character described, a magnetic belt, means for moving the belt at a constant speed, means including a plurality of magnetic heads contacting the tape and adapted to reproduce record tracks recorded thereon, a plurality of record heads, supporting means for said record heads serving to move the same relative to the tape to expand signals recorded thereon, said last named heads serving to record on tracks corresponding to the tracks engaged by said reproducing heads, a signal input adapted to have a composite signal applied to the same, said signal comprising successive compressed signal portions, and switching means for effectively applying the compressed portions of the input composite signal to selected ones of said record heads, whereby said signal portions are recorded on the various tracks and are simultaneously expanded.

(References on following page)

References Cited in the file of this patent

UNITED STATES PATENTS

| | | |
|---|---|---|
| 2,115,803 | Dudley | May 3, 1938 |
| 2,170,751 | Gabrilovitch | Aug. 22, 1939 |
| 2,306,435 | Graham | Dec. 29, 1942 |
| 2,352,023 | Schuller | June 20, 1944 |
| 2,406,349 | Buhrendorf | Aug. 27, 1946 |
| 2,411,683 | Guanella | Nov. 26, 1946 |
| 2,656,524 | Bridley et al. | Oct. 20, 1953 |
| 2,674,660 | Ambrose | Apr. 6, 1954 |
| 2,810,787 | Di Toro et al. | Oct. 22, 1957 |
| 2,813,927 | Johnson | Nov. 19, 1957 |
| 2,903,521 | Ellison | Sept. 8, 1959 |